United States Patent
Lim et al.

(10) Patent No.: US 10,261,172 B2
(45) Date of Patent: Apr. 16, 2019

(54) RADAR APPARATUS FOR VEHICLE AND METHOD OF REMOVING GHOST OF THE SAME

(71) Applicant: MANDO CORPORATION, Pyeongtaek-si, Gyeonggi-do (KR)

(72) Inventors: HaeSueng Lim, Yongin-si (KR); JaeEun Lee, Seoul (KR); Seong Hee Jeong, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 372 days.

(21) Appl. No.: 15/372,395

(22) Filed: Dec. 8, 2016

(65) Prior Publication Data
US 2017/0168139 A1    Jun. 15, 2017

(30) Foreign Application Priority Data
Dec. 11, 2015    (KR) .......................... 10-2015-0176711

(51) Int. Cl.
   *G01S 7/28*    (2006.01)
   *G01S 13/93*   (2006.01)
   *G01S 7/292*   (2006.01)

(52) U.S. Cl.
   CPC .......... *G01S 7/2921* (2013.01); *G01S 7/2813* (2013.01); *G01S 13/931* (2013.01); *G01S 2013/9375* (2013.01)

(58) Field of Classification Search
   CPC ...... G01S 7/292; G01S 7/2921; G01S 7/2922; G01S 7/2923; G01S 7/2927; G01S 7/2813; G01S 13/391
   See application file for complete search history.

(56) References Cited

U.S. PATENT DOCUMENTS 7,132,976 B2 * 11/2006 Shinoda ................ G01S 7/2925
                                                    342/70
7,504,988 B2 *  3/2009 Tsuchihashi ............ G01S 13/34
                                                    342/158

(Continued)

FOREIGN PATENT DOCUMENTS

JP    2010-071841 A    4/2010
JP    2010-217035 A    9/2010

(Continued)

OTHER PUBLICATIONS

Korean Office Action dated Nov. 21, 2017 in connection with the counterpart Korean Patent Application No. 10-2015-0176711.

*Primary Examiner* — Peter M Bythrow
(74) *Attorney, Agent, or Firm* — Hauptman Ham, LLP

(57) ABSTRACT

The present disclosure relates to a radar apparatus for vehicle and a method of removing a ghost of the radar apparatus for vehicle by determining a grating lobe ghost based on a reception signal received through linearly and equally spaced receiving antennas and unequally spaced receiving antennas. The radar apparatus comprises: a transmitting unit configured to transmit a predetermined transmission signal to the front of the vehicle through the plurality of transmitting antennas; a receiving unit configured to receive a reception signal generated from the transmission signal transmitted by the transmitting unit and reflected and returned by the target positioned in front of the vehicle through the plurality of receiving antennas and the additionally included receiving antenna; and a signal processing unit configured to remove a grating lobe ghost by using the difference of a gain obtained through a digital beamforming result and the reception signal.

14 Claims, 12 Drawing Sheets

(56) References Cited

U.S. PATENT DOCUMENTS

| | | | | |
|---|---|---|---|---|
| 2003/0179129 | A1* | 9/2003 | Tamatsu | G01S 7/354 342/70 |
| 2006/0262007 | A1* | 11/2006 | Bonthron | G01S 13/34 342/70 |
| 2011/0163906 | A1* | 7/2011 | Yang | G01S 7/03 342/27 |
| 2011/0163909 | A1* | 7/2011 | Jeong | G01S 13/4463 342/70 |
| 2011/0285573 | A1* | 11/2011 | Jeong | G01S 13/931 342/70 |
| 2012/0176266 | A1* | 7/2012 | Lee | G01S 7/023 342/27 |
| 2012/0188117 | A1* | 7/2012 | Jeong | H01Q 3/24 342/175 |
| 2012/0223852 | A1* | 9/2012 | Gross | G01S 13/931 342/70 |
| 2012/0235857 | A1* | 9/2012 | Kim | G01S 13/345 342/134 |
| 2013/0002470 | A1* | 1/2013 | Kambe | G01S 13/867 342/55 |
| 2013/0088393 | A1* | 4/2013 | Lee | G01S 7/354 342/372 |
| 2013/0187808 | A1* | 7/2013 | Kim | G01S 7/038 342/175 |
| 2013/0278456 | A1* | 10/2013 | Izumi | G01S 13/06 342/146 |
| 2015/0130655 | A1* | 5/2015 | Aizawa | G01S 3/74 342/147 |
| 2015/0229033 | A1* | 8/2015 | Choi | G01S 7/032 342/27 |

FOREIGN PATENT DOCUMENTS

| | | |
|---|---|---|
| JP | 4545460 B2 | 9/2010 |
| KR | 10-2014-0142014 A | 12/2014 |

* cited by examiner

RADAR APPARATUS FOR VEHICLE AND METHOD OF REMOVING GHOST OF THE SAME

CROSS REFERENCE TO RELATED APPLICATION

This application claims priority from Korean Patent Application No. 10-2015-0176711, filed on Dec. 11, 2015, which is hereby incorporated by reference for all purposes as if fully set forth herein.

BACKGROUND OF THE INVENTION

1. Field of the Invention

The present invention relates to a radar apparatus for vehicle and a method of removing a ghost of the radar apparatus for vehicle, and more particularly to a radar apparatus and a method of removing a ghost by determining a grating lobe ghost based on a reception signal received through linearly and equally spaced receiving antennas and unequally spaced receiving antennas.

2. Description of the Prior Art

Recently, the utilization of a driver safety system based on a radar for preventing a clash of vehicles and for safe driving has been gradually expanded. The driver safety system should measure information, such as the distances and the speeds of each target, required from the driver safety system in a high accuracy, although there are a plurality of targets.

Generally, a radar apparatus for vehicle used in the driver safety system uses a phased array antenna technology due to a limit of a space where the radar apparatus is installed in the vehicle.

In the phased array antenna, a digital beamforming and an angle estimating method use a method of using phases of each channel, which is different according to an angle formed by a receiving an antenna and a target.

However, when an interval between the receiving antennas is higher than a half wavelength, an angle of a target may be ambiguous according to a repetition of a phase. Therefore, in addition to an angle estimation, a target outside of FoV has a gain equal to that of a target in the FoV and an Angular Power Spectrum (APS) form similar to that of the target in the FoV as shown in FIG. 1, and thus the target outside of the FoV is detected as a ghost target. This is referred to as a grating lobe ghost.

In the radar apparatus for vehicle, a grating lobe ghost as shown in FIG. 2 may cause an error in a target sensing during driving.

Although a reception power of a target in a FoV is different from that of a target outside of the FoV according to the directivity of a transmitting antenna and a receiving antenna, it is not easy for the existing radar apparatus for the vehicle to determine a grating lobe ghost since there are targets having various RCSs from a pedestrian to a truck on a road.

The existing radar apparatus for a vehicle has problems, such as an SNR reduction due to a clutter outside the FoV and an angle resolution performance reduction, since a main beam becomes wide in the case of the beamforming when an interval of antennas becomes narrow close to a half wavelength in order to remove the grating lobe ghost.

CITATION LIST

Patent Document (Patent Citation 1) Korean Laid-Open Patent Publication 2014-0142014 (2014 Dec. 11) "A radar apparatus and an antenna apparatus"

SUMMARY OF THE INVENTION

An aspect of the present invention is to provide a radar apparatus for vehicle and a method of removing a ghost of the radar apparatus for vehicle capable of removing a ghost by determining a grating lobe ghost based on a reception signal received through linearly and equally spaced receiving antennas and unequally spaced receiving antennas.

According to an aspect of the present invention, a radar apparatus for vehicle, which senses a target positioned in front of a vehicle by including a plurality of transmitting antennas and a plurality of receiving antennas disposed on a substrate, and additionally includes a receiving antenna having an interval different from an interval between the plurality of receiving antennas on the substrate, comprises: a transmitting unit configured to transmit a predetermined transmission signal to the front of the vehicle through the plurality of transmitting antennas; a receiving unit configured to receive a reception signal generated from the transmission signal transmitted by the transmitting unit and reflected and returned by the target positioned in front of the vehicle through the plurality of receiving antennas and the additionally included receiving antenna; and a signal processing unit configured to remove a grating lobe ghost by using a difference of a gain obtained through a digital beamforming result in which the reception signals received through the plurality of receiving antennas and the reception signal received through the additionally included receiving antenna are added.

According to an aspect of the present invention, a radar apparatus for vehicle, which senses a target positioned in front of a vehicle by using a transmitting antenna including at least one long distance transmitting antenna and at least one short distance transmitting antenna, and a receiving antenna including a plurality of long distance receiving antennas and a plurality of short distance receiving antennas, comprises: a transmitting unit configured to transmit a predetermined transmission signal to the front of the vehicle through the transmitting antenna; a receiving unit configured to receive a reception signal generated from the transmission signal transmitted by the transmitting unit and reflected and returned by the target positioned in front of the vehicle through the receiving antenna; and a signal processing unit configured to remove a grating lobe ghost by using a difference of a gain obtained through a digital beamforming result in which a reception signal received through the plurality of long distance receiving antennas in the receiving antenna and a reception signal received through one short distance receiving antenna among the plurality of short distance receiving antennas disposed in an interval different from an interval of the plurality of long distance receiving antennas are added.

According to an aspect of the present invention, a radar apparatus for vehicle, which senses a target positioned in front of a vehicle by including a plurality of transmitting antennas and a plurality of receiving antennas disposed on a substrate, and additionally includes a receiving antenna having an interval different from an interval between the plurality of receiving antennas on the substrate, comprises: a transmitting unit configured to transmit a predetermined transmission signal to the front of the vehicle through the plurality of transmitting antennas; a receiving unit configured to receive a reception signal generated from the transmission signal transmitted by the transmitting unit and reflected and returned by the target positioned in front of the vehicle through the plurality of receiving antennas and the additionally included receiving antenna; and a signal processing unit configured to remove a grating lobe ghost determined by using a width of an Angular Power Spectrum (APS) generated based on the reception signal received through the plurality of receiving antennas and the reception signal received through the additionally included receiving antenna, and a predetermined reference width.

According to an aspect of the present invention, a radar apparatus for vehicle, which senses a target positioned in front of a vehicle by using a transmitting antenna including at least one long distance transmitting antenna and at least one short distance transmitting antenna, and a receiving antenna including a plurality of long distance receiving antennas and a plurality of short distance receiving antennas, comprises: a transmitting unit configured to transmit a predetermined transmission signal to the front of the vehicle through the transmitting antenna; a receiving unit configured to receive a reception signal generated from the transmission signal transmitted by the transmitting unit and reflected and returned by the target positioned in front of the vehicle through the receiving antenna; and a signal processing unit configured to remove a grating lobe ghost determined by using a width of an Angular Power Spectrum (APS) generated based on a reception signal received through the plurality of long distance receiving antennas in the receiving antenna and a reception signal received through one short distance receiving antenna among the plurality of short distance receiving antennas disposed in an interval different from an interval between the plurality of long distance receiving antennas, and a predetermined reference width.

According to an aspect of the present invention, a method of removing a ghost of a radar apparatus for vehicle, which senses a target positioned in front of a vehicle by including a plurality of transmitting antennas and a plurality of receiving antennas disposed on a substrate, and additionally includes a receiving antenna having an interval different from an interval between the plurality of receiving antennas on the substrate, comprises: transmitting a predetermined transmission signal to the front of the vehicle through the plurality of transmitting antennas; receiving a reception signal generated from the transmission signal that is transmitted, reflected, and returned by the target positioned in front of the vehicle through the plurality of receiving antennas and the additionally included receiving antenna; and removing a grating lobe ghost by using a difference of a gain obtained through a digital beamforming result in which the reception signals received through the plurality of receiving antennas and the reception signal received through the additionally included receiving antenna are added.

According to an aspect of the present invention, a method of removing a ghost of a radar apparatus for vehicle, which senses a target positioned in front of a vehicle by using a transmitting antenna including at least one long distance transmitting antenna and at least one short distance transmitting antenna, and a receiving antenna including a plurality of long distance receiving antennas and a plurality of short distance receiving antennas, comprises: transmitting a predetermined transmission signal to the front of the vehicle through the transmitting antenna; receiving a reception signal generated from the transmission signal that is transmitted, reflected, and returned by the target positioned in front of the vehicle through the receiving antenna; and removing a grating lobe ghost by using a difference of a gain obtained through a digital beamforming result in which a reception signal received through the plurality of long distance receiving antennas in the receiving antenna and a reception signal received through one short distance receiving antenna among the plurality of short distance receiving antennas disposed in an interval different from an interval of the plurality of long distance receiving antennas are added.

According to an aspect of the present invention, a method of removing a ghost of a radar apparatus for vehicle, which senses a target positioned in front of a vehicle by including a plurality of transmitting antennas and a plurality of receiving antennas disposed on a substrate, and additionally includes a receiving antenna having an interval different from an interval between the plurality of receiving antennas on the substrate, comprises: transmitting a predetermined transmission signal to the front of the vehicle through the plurality of transmitting antennas; receiving a reception signal generated from the transmission signal that is transmitted, reflected, and returned by the target positioned in front of the vehicle through the plurality of receiving antennas and the additionally included receiving antenna; and removing a grating lobe ghost determined by using a width of an Angular Power Spectrum (APS) generated based on the reception signal received through the plurality of receiving antennas and the reception signal received through the additionally included receiving antenna, and a predetermined reference width.

According to an aspect of the present invention, a method of removing a ghost of a radar apparatus for vehicle, which senses a target positioned in front of a vehicle by using a transmitting antenna including at least one long distance transmitting antenna and at least one short distance transmitting antenna, and a receiving antenna including a plurality of long distance receiving antennas and a plurality of short distance receiving antennas, comprises: transmitting a predetermined transmission signal to the front of the vehicle through the transmitting antenna; receiving a reception signal generated from the transmission signal that is transmitted, reflected, and returned by the target positioned in front of the vehicle through the receiving antenna; and removing a grating lobe ghost determined by using a width of an Angular Power Spectrum (APS) generated based on a reception signal received through the plurality of long distance receiving antennas in the receiving antenna and a reception signal received through one short distance receiving antenna among the plurality of short distance receiving antennas disposed in an interval different from an interval between the plurality of long distance receiving antennas, and a predetermined reference width.

According to the present aspect, a ghost can be removed by determining a grating lobe ghost based on a reception signal received through linearly and equally spaced receiving antennas and unequally spaced receiving antennas.

In addition, according to the present aspect, it can be determined that a target in a real FoV is a real target or a grating lobe ghost by calculating the difference of a gain obtained through a digital beamforming result in which reception signals received through a plurality of linearly and equally spaced long distance receiving antennas are added, and a difference of a gain obtained through a digital beamforming result in which reception signals through the plurality of long distance receiving antennas and one short distance receiving antenna among a plurality of short distance receiving antennas disposed in an interval different from an interval between the plurality of long distance receiving antennas. Therefore, problems caused by a grating lobe ghost target may be prevented during a constant speed driving control of a vehicle.

In addition, according to the present aspect, the driving safety of an autonomous vehicle may be secured by applying the present aspect to a driver convenience apparatus that autonomously drives while maintaining a proper distance from a vehicle positioned ahead, such as an SCC.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 1:
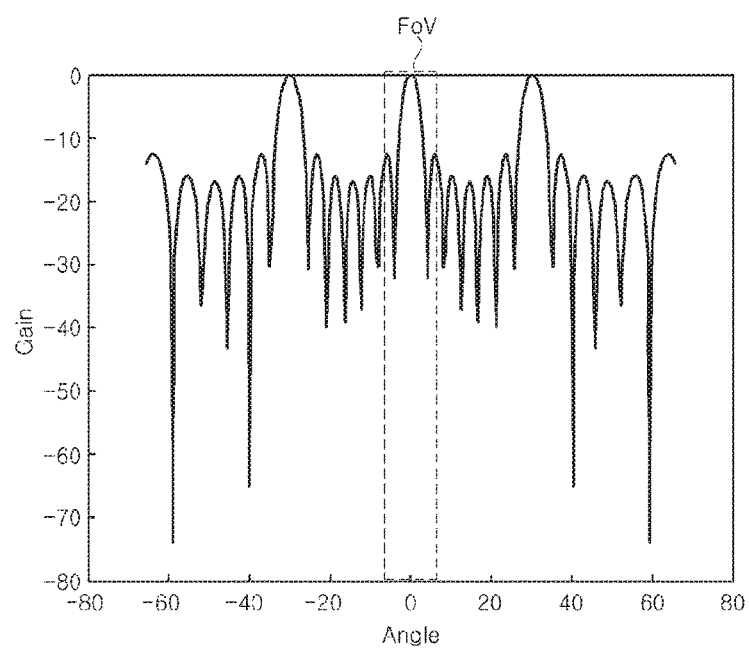
FIG. 1 and FIG. 2 are views for describing an existing radar apparatus for vehicle.
Figure 2:
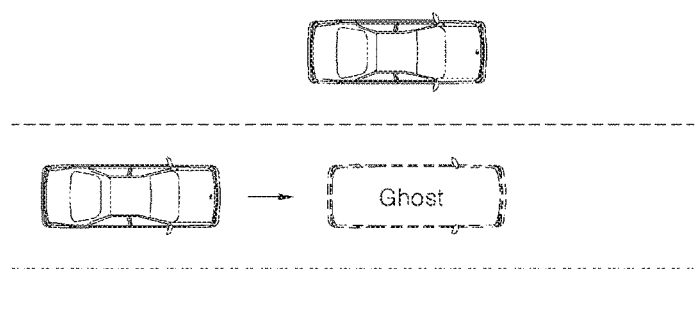
Figure 3:
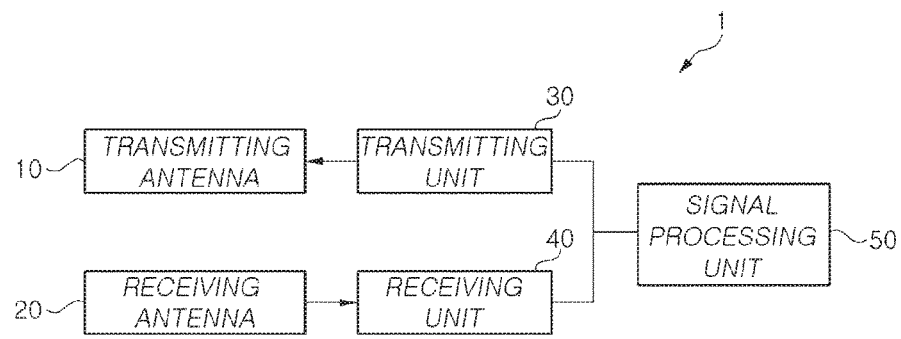
FIG. 3 is a block diagram for describing a radar apparatus for vehicle according to an exemplary embodiment.
Figure 4:
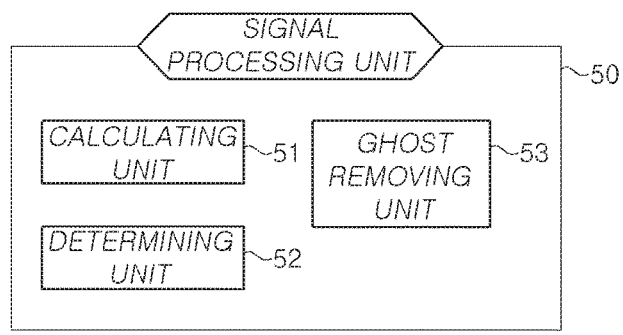
FIG. 4 is a block diagram for describing a signal processing unit illustrated in FIG. 3.

FIG. 3 illustrates a block diagram for describing a radar apparatus for vehicle according to an exemplary embodiment. FIG. 4 illustrates a block diagram for describing a signal processing unit illustrated in FIG. 3.

Referring to FIG. 3, the radar apparatus for vehicle 1 according to an embodiment of the present invention may be installed in front of a vehicle and may sense a target positioned in front of the vehicle.

The radar apparatus for vehicle includes a transmitting antenna 10, a receiving antenna 20, a transmitting unit 30, a receiving unit 40, and a signal processing unit 50.

The number of the transmitting antennas 10 is plural. The transmitting antenna 10 includes at least one long distance transmitting antenna and at least one short distance transmitting antenna.

The transmitting unit 30 transmits a predetermined transmission signal through the transmitting antenna 10. Specially, the transmitting unit 30 generates a continuous wave transmission signal to be transmitted to an object in front of the vehicle, and transmits the generated continuous wave transmission signal through the transmitting antenna 10. Here, the transmitting unit 30 may include a D/A converter which converts a digital signal into an analog signal.

The receiving antenna 20 uses an array antenna including a plurality of element antennas. A reception signal received from each element antenna is transferred to the signal processing unit 50.

The receiving unit 40 receives a reception signal generated from the transmission signal reflected and returned by the target, through the receiving antenna 20. Specially, when the continuous wave transmission signal is reflected and returned, the receiving unit 40 receives the returned continuous wave reflection signal. Here, the receiving unit 40 may include an A/D converter which converts a received analog signal into a digital signal.

The receiving antenna 20 includes a plurality of long distance receiving antennas and a plurality of short distance receiving antennas. In the present embodiment, for example, it is described that the receiving antenna 20 uses four long distance receiving antennas and four short distance receiving antennas.

In an array antenna, due to a design characteristic, a side lobe and a grating lobe are generated. Here, the side lobe is a signal formed by a radiation pattern of a far field, and is referred to as a signal not a main lobe. The grating lobe is a signal of a specific form of the side lobe, and has a periodicity. In addition, the generated position of the grating lobe is determined by an antenna interval of the array antenna.

In order to improve a performance of a radar apparatus, when an interval of antennas becomes wide, a grating lobe is moved to a central area. The reception size of the side lobe is smaller than that of the main lobe. However, the reception size of the grating lobe is equal to that of the main lobe. Therefore, when the grating lobe is not removed, a ghost target may be sensed. Here, the ghost target does not actually exist, but the ghost target is referred to as an error which is detected and generated in a signal process.

In order to remove the grating lobe in the present exemplary embodiment, a receiving antenna having an interval different from an interval of the receiving antenna 20 disposed on a substrate (not shown) is added. Alternatively, as shown in FIG. 7, one short distance receiving antenna disposed the most adjacently to a plurality of long distance receiving antennas among a plurality of short distance receiving antennas disposed in an interval different from that of the plurality of long distance receiving antennas is used.

Figure 7:
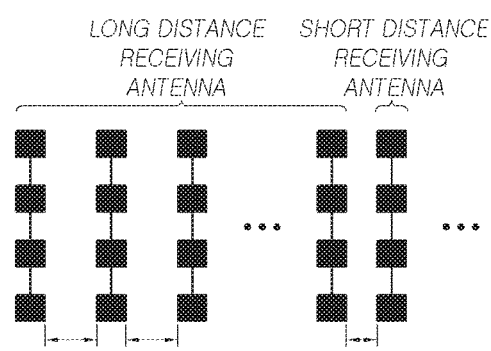
FIG. 7 is a view illustrating a plurality of long distance receiving antennas and a plurality of short distance receiving antennas disposed on a substrate.

For example, as shown in FIG. 7, the plurality of long distance receiving antennas are disposed in a first interval and the plurality of short distance receiving antennas are disposed in a second interval different from the first interval on the substrate. The second interval is smaller than the first interval. An interval of a long distance receiving antenna disposed on the right end among the plurality of long distance receiving antennas and a short distance receiving antenna disposed on the left end among the plurality of short distance receiving antennas is bigger or smaller than the first interval. For example, the interval of the long distance receiving antenna disposed on the right end among the plurality of long distance receiving antennas and the short distance receiving antenna disposed on the left end among the plurality of short distance receiving antennas may not be integer times of the first interval.

The signal processing unit 50 may remove the grating lobe ghost determined using a difference of a gain obtained through a digital beamforming in which reception signals received from the receiving antenna 20 disposed on the substrate and the added receiving antenna having the interval different from the interval of the receiving antenna 20 are added, or reception signals received from the plurality of long distance receiving antennas and one short distance receiving antenna the most adjacent to the plurality of long distance receiving antennas among the plurality of short distance receiving antennas having the interval different from that of the plurality of long distance receiving antennas are added. For example, the signal processing unit 50 may remove the grating lobe ghost using a gain difference of each lobe by calculating a gain difference of each lobe for a lobe of which a gain value is calculated as a gain value equal to, or higher than, a predetermined gain value of an angular power spectrum obtained through a digital beamforming result in which the reception signals received from the plurality of receiving antennas are added and an angular power spectrum obtained through a digital beamforming result in which the reception signals received from the plurality of receiving antennas and the added receiving antenna are added.

Hereinafter, it is described that the grating lobe ghost is removed by using reception signals received from the plurality of long distance receiving antennas disposed in the first interval on the substrate and one short distance receiving antenna (hereinafter, referred to as 'ghost removing antenna') the most adjacent to the plurality of long distance receiving antenna among the plurality of short distance receiving antennas disposed in the interval different from the plurality of long distance receiving antennas.

In addition, the signal processing unit 50 may remove the grating lobe ghost determined using a width of an angular power spectrum indicating gains of each angle of targets generated based on the reception signals received from the plurality of long distance receiving antennas and the ghost removing antenna among the reception signals received through the receiving antenna 20, and not even the signal processing unit 50 uses the above-mentioned difference of gain.

Referring to FIG. 4, the signal processing unit 50 includes a calculating unit 51, an angle estimating unit 52 and a target determining unit 53.

The signal processing unit 50 processes the transmission signal of the transmitting unit 30 and the reception signal received by the receiving unit 40. That is, the signal processing unit 50 may estimate a plurality of distances by processing the plurality of reception signals generated from the transmission signal which is transmitted by the transmitting unit 30, reflected, and returned, and may determine a target positioned in the closet distance among the plurality of estimated distances as a real target.

The calculating unit 51 calculates each of the difference of a gain obtained from the digital beamforming result in which the plurality of reception signals received by the receiving unit 40. More specifically, the plurality of reception signals received from the plurality of long distance receiving antennas are added, and the difference of a gain obtained from the digital beamforming result in which the plurality of reception signals received by the receiving unit 40. More specifically, the plurality of reception signals received from the plurality of long distance receiving antennas and the ghost removing antenna are added.

Alternatively, the calculating unit 51 determines a plurality of lobes calculated as a gain value equal to, or higher than, a predetermined gain value in an angular power spectrum obtained from the digital beamforming result in which the plurality of reception signals received from the plurality of long distance receiving antennas are added, and calculates a gain difference for the plurality of determined lobes in the angular power spectrum obtained from the digital beamforming result in which the plurality of reception signals received from the plurality of long distance receiving antennas and the ghost removing antenna are added. If a corresponding lobe is the grating lobe ghost, the gain difference is equal to, or higher than, a reference difference, and if the corresponding lobe is a main lobe by the target, the gain difference is calculated as 'zero'.

In addition, the calculating unit 51 calculates a difference of a second gain obtained from the digital beamforming result in which the plurality of long distance receiving antennas and the ghost removing antenna are added, that is, a difference of a gain between targets sensed in front of the vehicle.

Meanwhile, the calculating unit 51 calculates a width between predetermined points in FoV of an Angular Power Spectrum (APS) generated for estimating an angle of the target based on the reception signals received from the plurality of long distance receiving antennas and the ghost removing antenna. At this time, the predetermined point may be a point spaced apart from a peak point by a predetermined interval, a point equal to or lower than the peak point by 10% or less, or a point of −3 dB from the peak point, but the present invention is not limited thereto.

The determining unit 52 determines whether the gain difference of each lobe, which is calculated by the calculating unit 51, is higher than the predetermined reference difference, and determines whether the target in front of the vehicle is the grating lobe ghost or the real target according to the determination result.

More specifically, the determining unit 52 determines that the target by the corresponding lobe positioned in front of the vehicle is the grating lobe ghost when the calculated gain difference of each lobe is higher than the predetermined reference difference, and the determining unit 52 determines that the target by the corresponding lobe positioned in front of the vehicle is the real target when the calculated gain difference of each lobe is not higher than the predetermined reference difference.

As a result of the determining unit 52, when the target is the grating lobe ghost, the ghost removing unit removes a grating lobe peak so that a grating lobe ghost target is not sensed.

In addition, the determining unit 52 may determine whether the corresponding specific lobe is the grating lobe ghost by comparing a specific lobe width of the APS by the calculating unit 51 with a predetermined reference width. More specifically, when the specific lobe width of the APS is higher than the predetermined reference width, the determining unit 52 determines that the corresponding specific lobe is the grating lobe ghost. Otherwise, the determining unit 52 determines that the corresponding specific lobe is the real target.

When the corresponding specific lobe is determined as the grating lobe ghost according to the determination result of the determining unit 52, the ghost removing unit 53 removes the grating lobe peak so that the grating lobe ghost target is not selected as a chase control object.

A method of removing a ghost of the radar apparatus for vehicle having the above-mentioned configurations is described with reference to FIG. 5.

Figure 5:
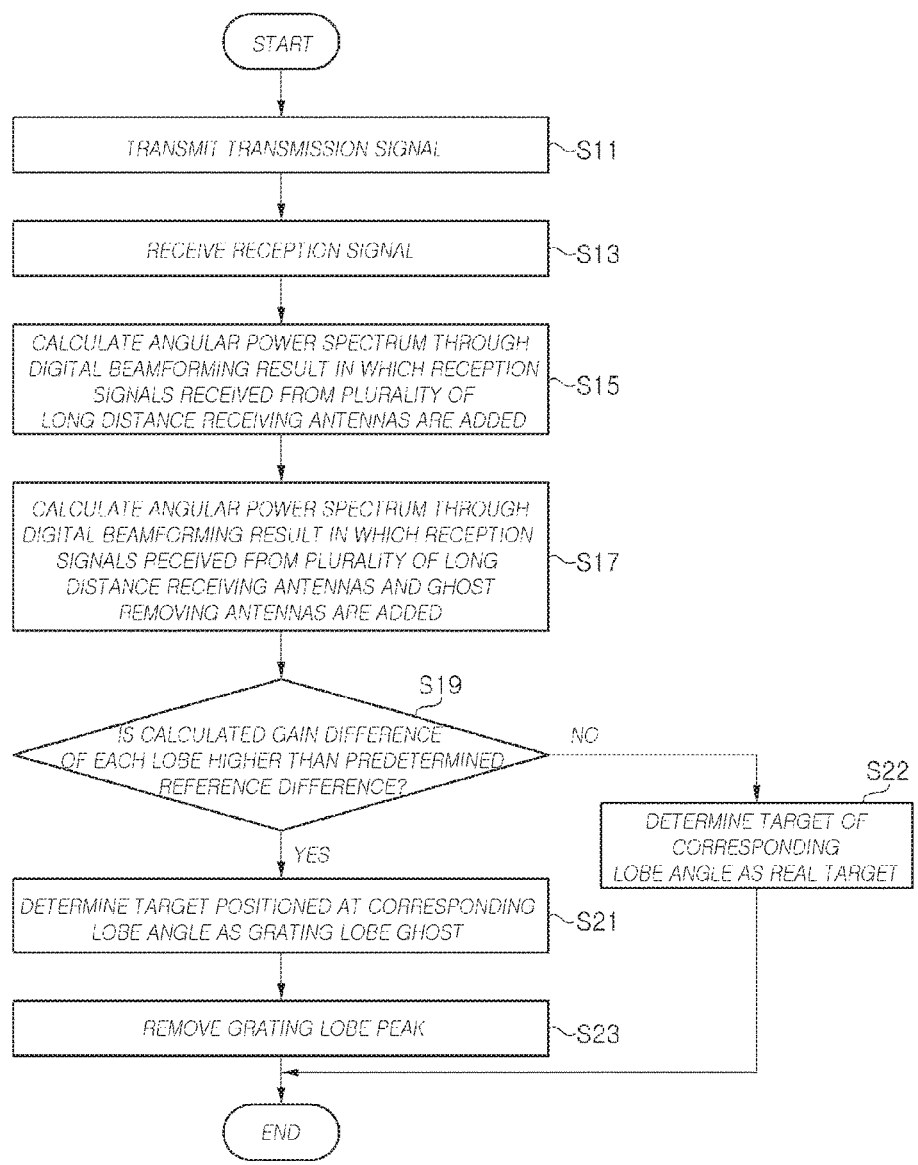
FIG. 5 is a flowchart for describing a method of removing a ghost of a radar apparatus for vehicle according to another exemplary embodiment.

FIG. 5 illustrates a flowchart for describing a method of removing a ghost of a radar apparatus for vehicle according to another exemplary embodiment of the present invention.

Referring to FIG. 5, a transmitting unit 30 included in a radar apparatus for vehicle 1 generates a transmission signal to be transmitted to an object in front of a vehicle, for example, a continuous wave transmission signal, and transmits the generated transmission signal through a transmitting antenna 10 (S11). At this time, for example, the transmitting antenna 10 includes one long distance transmitting antenna and one short distance transmitting antenna.

A receiving unit 40 included in the radar apparatus for vehicle 1 receives a reception signal generated from the transmission signal transmitted through the transmitting antenna 10, reflected and returned from the target, through a receiving antenna 20 (S13).

At this time, as described in the above exemplary embodiment, for example, the receiving antenna 20 includes four long distance receiving antennas disposed in the first interval (e.g., 2λ) and four short distance receiving antennas disposed in the second interval (e.g., 1.5λ) different from the first interval (e.g., 2λ) in the right end of the four long distance receiving antennas.

A signal processing unit 50 included in the radar apparatus for vehicle 1 calculates an angular power spectrum obtained through beamforming result in which reception signals received from the receiving antenna 20, more specifically, a plurality of linearly and equally spaced long distance receiving antennas are added (S15).

Figure 8:
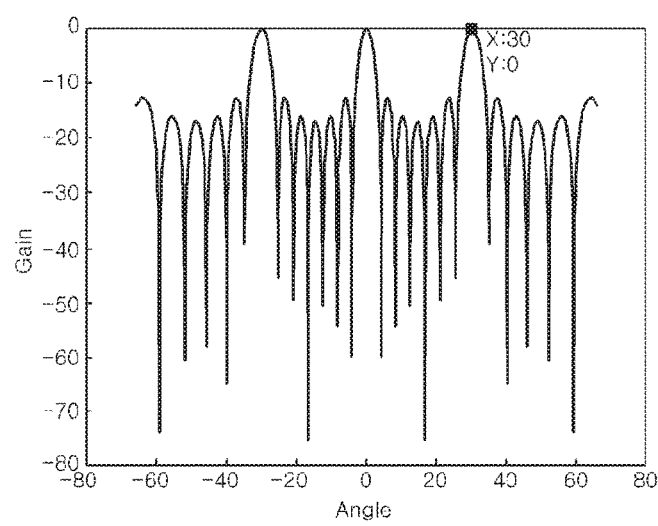
FIG. 8 is graph illustrating a digital beamforming result in which reception signals received from a plurality of long distance receiving antennas having a first interval are added.

FIG. 8 is a graph illustrating a digital beamforming result in which reception signals of long distance receiving antennas disposed in a first interval are added. All gains of targets positioned in front of the vehicle obtained through the digital beamforming result are calculated as 0. Here, gains of each of three targets are calculated as 0. FIG. 8 is an angular power spectrum obtained through the digital beamforming result. Here, lobes calculated as a gain value equal to or higher than a predetermined gain value are three lobes of 0 degree, +30 degrees, and −30 degrees. But, gains of each lobe are the same, and thus it is difficult to determine if each of the lobes is the main lobe or the grating lobe ghost.

Figure 9:
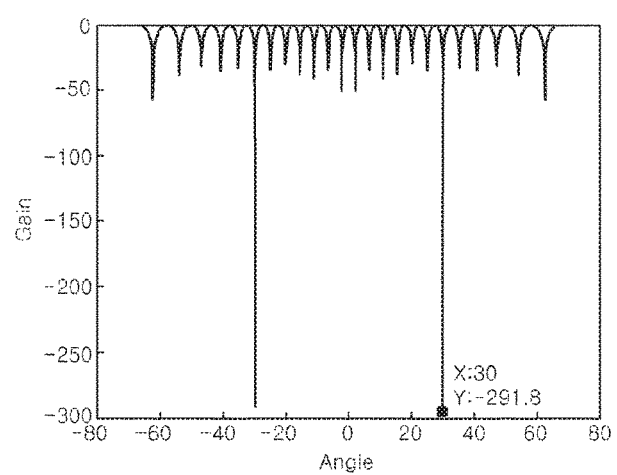
FIG. 9 is a graph illustrating a digital beamforming result in which reception signals received from one short distance receiving antenna disposed at the right end of a plurality of long distance receiving antennas among a plurality of short distance receiving antennas disposed in an interval different from a first interval between the plurality of long distance receiving antennas are added.

FIG. 9 is a graph illustrating a digital beamforming result in which reception signals received from a ghost removing antenna are added.

Figure 10:
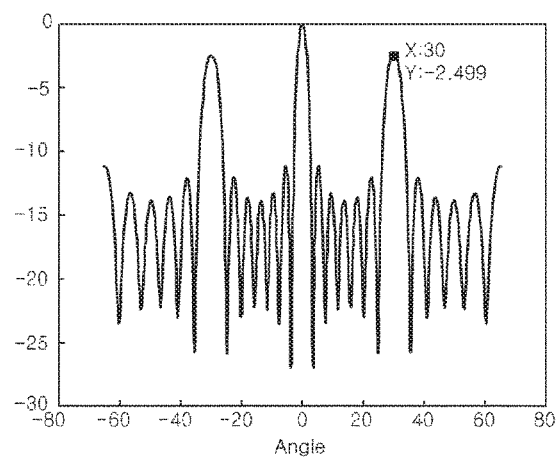
FIG. 10 is a graph illustrating a digital beamforming result in which reception signals received from a plurality of long distance receiving antennas and one short distance receiving antenna are added.

FIG. 10 illustrates a digital beamforming result in which the reception signals received from the plurality of long distance receiving antennas illustrated in FIG. 8 and the reception signals received from the ghost removing antenna illustrated in FIG. 9 are added.

The signal processing unit 50 calculates an angular power spectrum obtained through a digital beamforming result in which the reception signals received from the receiving antenna 20. More specifically, the plurality of long distance receiving antennas disposed in the first interval and the above-mentioned ghost removing antenna are added (S17).

The signal processing unit 50 calculates gain difference between targets positioned in front of the vehicle obtained through the digital beamforming result. That is, the signal processing unit 50 calculates gain difference of each lobe by using the angular power spectrums of FIG. 8 and FIG. 10. Here, a gain difference of a target positioned at −30 degrees is calculated as about −2.499, a gain difference of a target positioned at 0 degree is calculated as 0, and a gain difference of a target positioned at 30 degrees is calculated as about −2.499.

Next, the signal processing unit 50 determines whether the gain differences of each lobe is higher than a predetermined reference difference (S19).

As a result of step S19, when the calculated gain difference is smaller than the predetermined reference difference, the signal processing unit 50 determines that a target of a corresponding lobe angle as a real target (S22). Next, the signal processing unit 50 controls a movement of the vehicle so that the vehicle autonomously drives while maintaining an appropriate distance from the determined real target.

As the result of step S19, when the calculated gain difference is higher than the predetermined reference difference, the signal processing unit 50 determines that the target in front of the vehicle, which is positioned at the corresponding lobe angle, as the grating lobe ghost (S21).

The signal processing unit 50 removes the grating lobe peak (S23). Thus, the signal processing unit 50 determines that the front target by the corresponding lobe is the grating lobe ghost target so that the front target is not selected as the chase control target.

Accordingly, it may be determined whether a target in a real FoV is the real target or the grating lobe ghost. Therefore, problems generated due to the grating lobe ghost target may be prevented during a constant speed driving control of a vehicle.

Hereinafter, a method of removing a ghost in a method different from the method of the exemplary embodiment of FIG. 5 is described with reference to FIG. 6.

Figure 6:
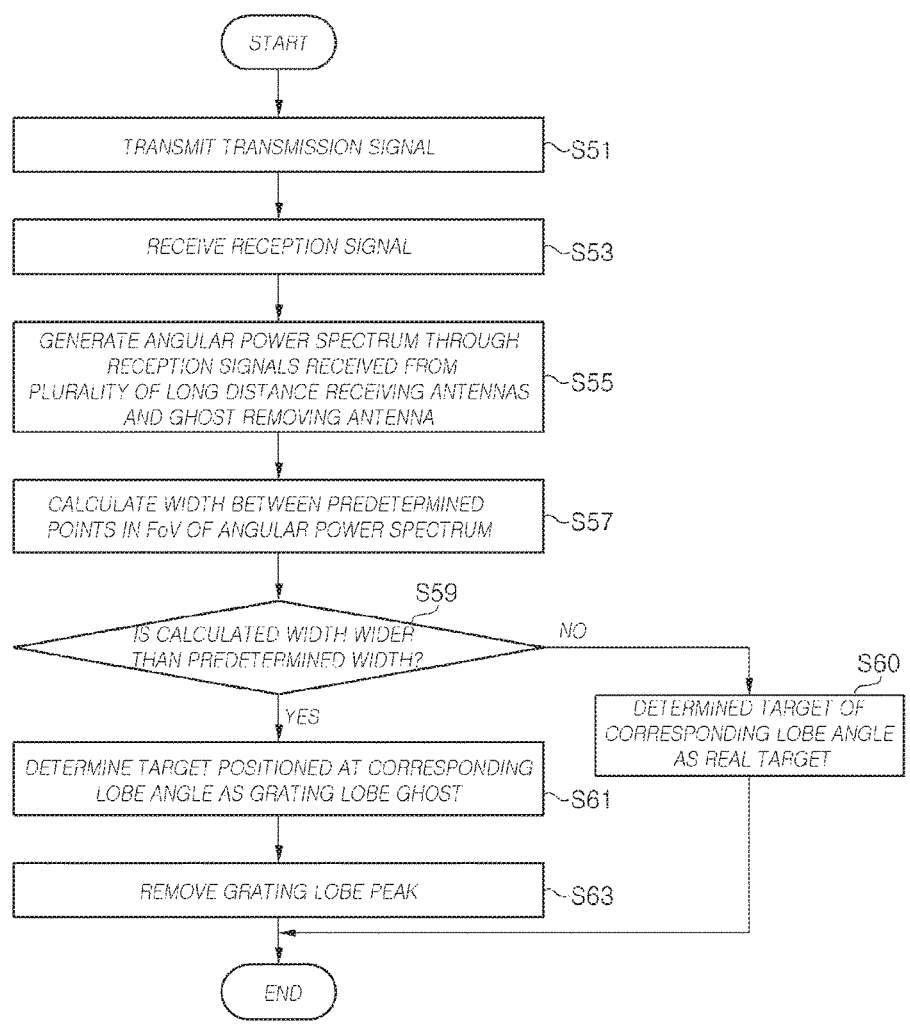
FIG. 6 is a flowchart for describing a method of removing a ghost of a radar apparatus for vehicle according to further another exemplary embodiment.

FIG. 6 illustrates a flowchart for describing a method of removing a ghost of a radar apparatus for vehicle according to another further exemplary embodiment of the present invention.

Referring to FIG. 6, a transmitting unit 30 included in a radar apparatus for vehicle 10 generates a transmission signal to be transmitted to an object in front of a vehicle, for example, a continuous wave transmission signal, and transmits the generated transmission signal through a transmitting antenna 10 (S51). At this time, for example, the transmitting antenna 10 includes one long distance transmitting antenna and one short distance transmitting antenna.

A receiving unit 40 included in the radar apparatus for vehicle 1 receives a reception signal generated from the transmission signal transmitted through the transmitting antenna 10, reflected and returned from the target, through a receiving antenna 20 (S53). At this time, as described above exemplary embodiment, for example, the receiving antenna 20 includes four long distance receiving antennas disposed in the first interval (e.g., 2λ) and four short distance receiving antennas disposed in the second interval (e.g., 1.5λ) different from the first interval (e.g., 2λ) in the right end of the four long distance receiving antennas.

A signal processing unit 50 included in the radar apparatus for vehicle 1 generates an angular power spectrum through reception signals received from the receiving antenna 20. More specifically, a plurality of long distance receiving antennas disposed in the first interval and the ghost removing antenna (S55). The angular power spectrum is generated in a process for estimating an angle of the target.

Figure 11:
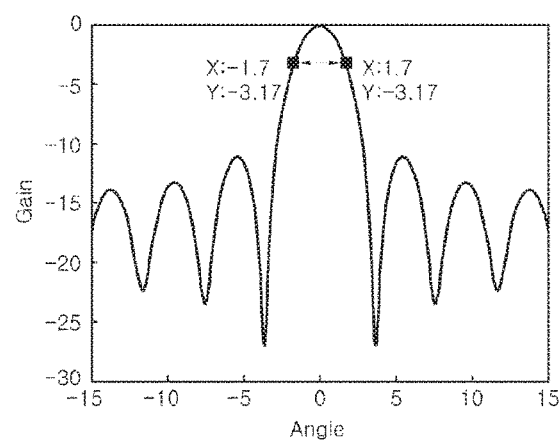
FIG. 11 is a graph illustrating an angular power spectrum when a target is determined as a real target.
Figure 12:
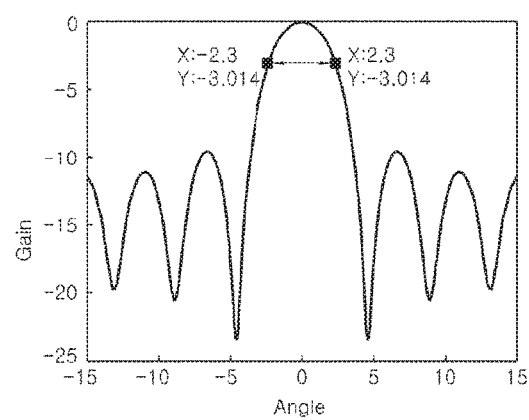
FIG. 12 is a graph illustrating an angular power spectrum when a target is determined as a grating lobe ghost target.

FIG. 11 illustrates an angular power spectrum when a target is determined as a real target. FIG. 12 illustrates an angular power spectrum when a target is determined as a grating lobe ghost target.

The signal processing unit 50 calculates the width between predetermined points in FoV of the generated angular power spectrum (S57).

The signal processing unit 50 determines whether the calculated width is wider than a predetermined reference width (S59).

As a result of step S59, when the calculated width is narrower than the predetermined reference width, the signal processing unit 50 determines that the front target positioned a corresponding lobe angle as a real target (S60).

Next, the signal processing unit 50 controls a movement of the vehicle so that the vehicle autonomously drives while maintaining an appropriate distance from the determined real target.

As the result of step S59, when the calculated width is wider than the predetermined reference width, the signal processing unit 50 determines that the front target positioned at the corresponding lobe angle as the grating lobe ghost (S61).

The signal processing unit 50 removes the grating lobe peak positioned at the grating lobe angle (S63). Thus, the signal processing unit 50 determines that the front target positioned the grating lobe angle is the grating lobe ghost target so that the front target is not selected as the chase control target.

As described above, it may be determined a front target positioned at a corresponding lobe angle of each lobe is a real target or a grating lobe ghost target by comparing the width between predetermined points in FoV of an angular power spectrum with a predetermined reference width. Therefore, the present invention can be applied to a driver convenience apparatus which autonomously drives while maintaining a proper distance from a vehicle positioned ahead, such as an SCC, and thus a driving safety of an autonomous vehicle can be secured.

The scope of the present invention should be interpreted by claims attached thereto, and it should be interpreted that all technical spirits within the scope equivalent to the claims pertains to the scope of the present invention.

What is claimed is:

1. A radar apparatus for vehicle, which senses a target positioned in front of a vehicle by including a plurality of transmitting antennas and a plurality of receiving antennas disposed on a substrate, the radar apparatus for vehicle comprising:
    a transmitting unit configured to transmit a predetermined transmission signal to the front of the vehicle through the plurality of transmitting antennas;
    a receiving unit configured to receive a reception signal generated from the transmission signal transmitted by the transmitting unit and reflected and returned by the target positioned in front of the vehicle through the plurality of receiving antennas and an added receiving antenna; and
    a signal processing unit configured to remove a grating lobe ghost by using at least one of a digital beamforming result in which the reception signals received through the plurality of receiving antennas are added, and a digital beamforming result in which the reception signals received through the plurality of receiving antennas and the reception signal received through the added receiving antenna are added,
    wherein the added receiving antenna has an interval different from an interval between the plurality of receiving antennas.

2. The radar apparatus for vehicle of claim 1, wherein the signal processing unit comprises:
    a calculating unit configured to calculate a gain difference of each lobe of which a gain value is equal to, or higher than, a predetermined gain value of an angular power spectrum obtained through the digital beamforming result in which the reception signals received through the plurality of receiving antennas are added and an angular power spectrum obtained through the digital beamforming result in which the reception signals received through the plurality of receiving antennas and the reception signal received through the added receiving antenna are added; and
    a ghost removing unit configured to remove a corresponding grating lobe ghost by determining the lobe as the grating lobe ghost, when the calculated gain difference of each lobe is higher than a predetermined reference difference.

3. The radar apparatus for vehicle of claim 2, wherein the calculating part calculates the gain difference of each lobe by mutually comparing gains of the lobes generated in the same angle of the angular power spectrum, and determines a lobe of which the gain difference of each lobe is zero as a main lobe.

4. The radar apparatus for vehicle of claim 1, wherein the plurality of receiving antennas are long distance receiving antennas, and the added receiving antenna is one receiving antenna most adjacent to the long distance receiving antennas, among a plurality of short distance receiving antennas.

5. The radar apparatus for vehicle of claim 1, wherein the signal processing unit removes the grating lobe ghost by using a comparison result obtained by comparing a lobe width of an angular power spectrum obtained through the digital beamforming result in which the reception signals received through the plurality of receiving antennas and the reception signal received through the added receiving antenna are added with a predetermined reference width.

6. The radar apparatus for vehicle of claim 5, wherein the signal processing unit comprises:
    a calculating unit configured to calculate a lobe width for at least one lobe of the angular power spectrum in a predetermined gain value; and
    a determining unit configured to determine the lobe as the grating lobe ghost when the lobe width is equal to, or higher than, the reference width.

7. The radar apparatus for vehicle of claim 6, wherein the signal processing unit further comprises a ghost removing unit configured to determine the lobe as a main lobe when the lobe width is lower than the reference width and to remove the lobe determined as the grating lobe ghost.

8. A method of removing a ghost of a radar apparatus for vehicle, which senses a target positioned in front of a vehicle by including a plurality of transmitting antennas and a plurality of receiving antennas disposed on a substrate, the method comprising:
    transmitting a predetermined transmission signal to the front of the vehicle through the plurality of transmitting antennas;
    receiving a reception signal generated from the transmission signal transmitted, reflected and returned by the target positioned in front of the vehicle through the plurality of receiving antennas and an added receiving antenna; and removing a grating lobe ghost by using at least one of a digital beamforming result in which the reception signals received through the plurality of receiving antennas are added, and a digital beamforming result in which the reception signals received through the plurality of receiving antennas and the reception signal received through the added receiving antenna are added, wherein the added receiving antenna has an interval different from an interval between the plurality of receiving antennas.

9. The method of claim 8, wherein the removing comprises:

calculating a gain difference of each lobe of which a gain value is equal to, or higher than, a predetermined gain value of an angular power spectrum obtained through the digital beamforming result in which the reception signals received through the plurality of receiving antennas are added and an angular power spectrum obtained through the digital beamforming result in which the reception signals received through the plurality of receiving antennas and the reception signal received through the added receiving antenna are added; and removing a corresponding grating lobe ghost by determining the lobe as the grating lobe ghost when the calculated gain difference of each lobe is higher than a predetermined reference difference.

10. The method of claim 9, wherein the calculating comprises calculating the gain difference of each lobe by mutually comparing gains of the lobes generated in the same angle of the angular power spectrum, and determining a lobe of which the gain difference of each lobe is zero as a main lobe.

11. The method of claim 8, wherein the plurality of receiving antennas are long distance receiving antennas, and the added receiving antenna is one receiving antenna most adjacent to the long distance receiving antennas, among a plurality of short distance receiving antennas.

12. The method of claim 8, wherein the removing comprises removing the grating lobe ghost by using a comparison result obtained by comparing a lobe width of an angular power spectrum obtained through the digital beamforming result in which the reception signals received through the plurality of receiving antennas and the reception signal received through the added receiving antenna are added with a predetermined reference width.

13. The method of claim 12, wherein the removing comprises:

calculating a lobe width for at least one lobe of the angular power spectrum in a predetermined gain value; and determining the lobe as the grating lobe ghost when the lobe width is equal to, or higher than, the reference width.

14. The method of claim 13, wherein the removing further comprises determining the lobe as a main lobe when the lobe width is lower than the reference width, and removing the lobe determined as the grating lobe ghost.

* * * * *